United States Patent
Macielinski

[15] 3,664,152
[45] May 23, 1972

[54] CONSTANT VELOCITY UNIVERSAL JOINTS

[72] Inventor: Jerzy Witold Macielinski, Birmingham, England

[73] Assignee: GKN. Birfield Transmissions Limited, Erdington, Birmingham, England

[22] Filed: Feb. 4, 1971

[21] Appl. No.: 112,725

[30] Foreign Application Priority Data

Feb. 4, 1970  Great Britain..........................5,315/70

[52] U.S. Cl......................................................64/8, 64/21
[51] Int. Cl..............................................................F16d 3/30
[58] Field of Search...................................................64/8, 21

[56] References Cited

UNITED STATES PATENTS

| | | | |
|---|---|---|---|
| 3,362,192 | 1/1968 | Orain | 64/21 |
| 3,464,232 | 9/1969 | Hutchinson | 64/21 |
| 3,488,979 | 1/1970 | Croset | 64/21 |

Primary Examiner—Kenneth W. Sprague
Attorney—Spencer & Kaye

[57] ABSTRACT

A constant velocity universal joint includes balls which transmit torque between the joint outer member and the joint inner member. An annular restraining member is formed separately from and acts between the outer member and a cage which serves to guide the balls into the bisector plane of the joint. The restraining member assists in preventing relative axial movement between the inner and outer members of the joint.

8 Claims, 1 Drawing Figure

PATENTED MAY 23 1972 3,664,152
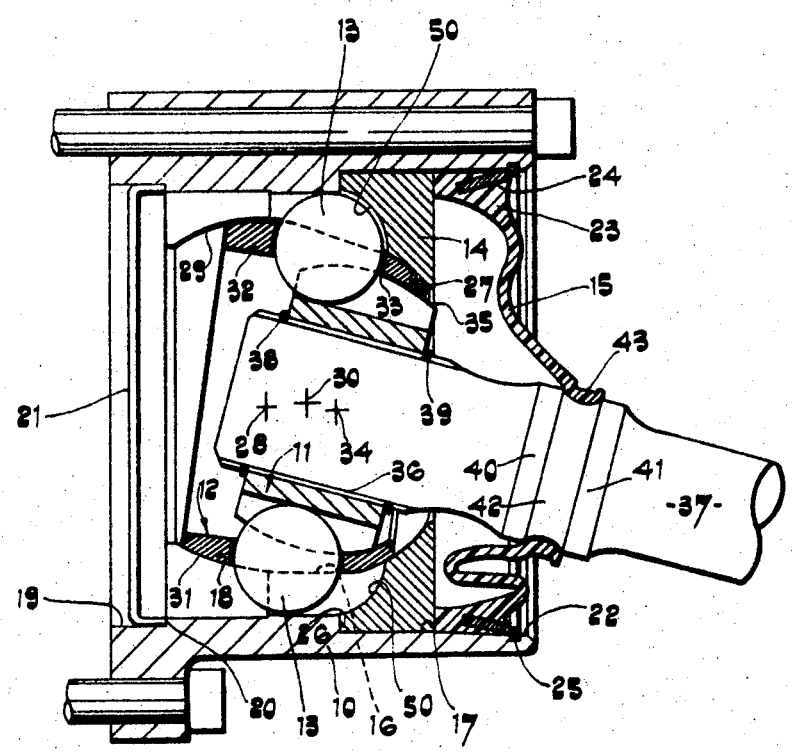

CONSTANT VELOCITY UNIVERSAL JOINTS

BACKGROUND OF THE INVENTION

A. Field of the Invention

This invention relates to constant velocity universal joints of the kind which include inner and outer members formed with grooves which cooperate to form tracks which are angularly distributed around the joint axis and which are engaged by torque-transmitting balls which move along the grooves during relative angular movement between the inner and outer members, a cage being located between the inner and outer members and serving to guide the balls into the bisector plane of the joint.

B. Description of the Prior Art

Joints of the above kind are known which are constructed to accommodate relative axial movement between the inner and outer members and in which the grooves in the inner and outer members have straight axes whereby they can be formed by broaching. It is an object of the present invention to provide an improved form of joint of the above kind in which relative axial movement between the joint members is not obtained.

SUMMARY OF THE INVENTION

A restraining member is formed separately from and acts between the joint outer member and the cage to assist in preventing relative axial movement between the inner and outer members of the joint.

BRIEF DESCRIPTION OF THE DRAWING

The single FIGURE of the drawing is a sectional view of a constant velocity universal joint.

DESCRIPTION OF THE PREFERRED EMBODIMENT

As shown in the drawing the joint includes an outer member 10, an inner member 11, and a cage 12 formed with six equi-angularly spaced apertures in which balls 13 are received, restraining means indicated generally at 14 and a sealing gaiter 15. The outer member 10 is formed with a through bore which, for the central portion 16 of its length is of cylindrical form and said cylindrical portion 16 is located adjacent a further cylindrical portion 17 which is of increased internal diameter as compared with said portion 16. On the other side of the portion 16, the bore includes a portion 18 of part-spherical form and the cylindrical portion 16 and part-spherical portion 18 are formed with longitudinally extending grooves which are of generally part-cylindrical cross-section.

At one end of the bore in the outer member 10, a counterbore 19 is formed and a shoulder 20 is thus provided against which is seated a closure member 21 which closes that end of the bore.

At the other end of the bore in the outer member 10, an inclined counterbore 22 is formed and the counterbore 22 receives an annular portion 23 of the gaiter 15, said annular portion 23 being reinforced by a metal reinforcing element 24. The annular portion 23 of the gaiter 15 is held in position in the counterbore 22 by a spring clip 25 located in a groove in the wall of the counterbore 22. Said portion 23 of the gaiter serves to bias the restraining means 14 into engagement with a shoulder 26 provided at the junction between the bore portions 16 and 17. As can be seen from the drawing, the restraining means 14 is in the form of an annulus having an inwardly facing part-spherical surface 27 which is recessed to provide recesses 50 which are of part-spherical form and are in line with the grooves in the outer member 10 whereby the balls 13 are free to move so as partially to enter the recesses 50 in the restraining means 14.

The center of the part-spherical surface 27 is a point 28 which is also the center of the part-spherical surface 29 of the bore portion 18. The center of the joint, i.e. the point of intersection of the longitudinal axes of the inner and outer members, is a point 30 and, as can be seen from the drawing, the point 28 is spaced from the point 30.

The cage 12 is constructed as described in U.S. specification No. 3,464,232 and has a part-spherical outer surface 31 which has its center of curvature at the point 28 and the cage outer surface 31 mates with the part-spherical surfaces 27 and 29 of the restraining means 14 and bore portion 18 respectively. The cage 12 is counterbored at 32 to provide a counterbore which, as explained in Specification No. 3,464,232, serves to facilitate assembly of the cage 12 and inner member 11.

The cage 12 has a part-spherical inner surface 33 which has its center of curvature at a point 34 off-set from the joint center 30 by an equal and opposite amount to the point 28. The part-spherical inner surface 33 of the cage 12 mates with the part-spherical outer surface 35 of the inner member 11 and this off-set centers arrangement serves, as fully described in Specification No. 3,464,232, to ensure that, during joint articulation, the cage 12 moves in such a way as to maintain the centers of the balls 13 in the bisector plane of the joint.

The inner member 11 of the joint is formed with a splined bore for engagement with an externally splined portion 36 of a shaft 37 which may be either the driving or the driven shaft of the joint and the inner member 11 is maintained in fixed relationship with the shaft 37 by means of a pair of clips 38 and 39. Alternatively the inner member 11 may be formed integrally with the shaft 37. The shaft 37 is formed with a pair of spaced ribs 40 and 41 between which an annular groove 42 is defined and the inner portion 43 of the gaiter 15 is seated in said groove and is clamped in position with an increased diameter portion thereof fixed between the two ribs 40 and 41 by clip means (not shown).

The dimensions and configuration of the cage 12, the part-spherical bore portion 18 of the outer member 10 and of the part-spherical surface 27 of the restraining element 14 are shaped so that, during joint articulation, the cage moves about the point 28 and is restrained, by engagement of the outer surface thereof with the part-spherical surfaces 29 and 27 of the outer member and restraining means 14 respectively from moving axially. In the absence of the restraining means 14, the cage 12 would be free to move to the right as viewed in the drawing to allow relative axial movement between the inner member 11 and the outer member 10 with the inner member 11 moving relatively to the right as viewed in the drawing. The bore of the outer member 10 would not, however include two portions 16 and 17 of different radii but would be of uniform cross-section. To allow axial plunge in both directions from the relative positions shown in the drawing, the bore in the outer member 10 would not include a part-spherical portion such as that indicated at 18.

The cage 12, the balls 13 and the inner member 11 of the joint shown in the drawing are identical to the cage, balls and inner member of a joint designed to accommodate axial plunge so that, where a manufacturer wishes to produce both fixed and plunging constant velocity universal joints the number of separate components which he has to manufacture is reduced, i.e. the only additional component which he would have to make to produce a plunging universal joint would be an outer member of slightly different form. By designing both the fixed and plunging joints, the plunging joint being as shown in U.S. Pat. specification No. 3,464,232, and the fixed joint being as shown in the drawing, so that the two joints have common components, the cost of manufacture thereof is considerably reduced.

I claim:

1. In a constant velocity universal joint of the kind which includes inner and outer members formed with grooves which co-operate to form tracks which are angularly distributed around the joint axis and which are engaged by torque-transmitting balls which move along the grooves during relative movement between the inner and outer members, with a cage located between the inner and outer members and serving to guide the balls into the bisector plane of the joint, the improvement comprising restraining means acting between the outer member and the cage and formed separate from said outer member and said cage, said restraining means assisting in preventing relative axial movement between the cage and outer member in at least one direction.

2. A constant velocity universal joint according to claim 1 wherein movement of the cage relative to the outer member in a first direction is prevented by said restraining means and wherein the outer member includes a bore portion of part-spherical form which engages the outer surface of the cage to prevent movement of the cage relative to the outer member in a direction opposite to said first direction.

3. A constant velocity universal joint according to claim 1 wherein the outer member is formed with an internal shoulder, the restraining means is of annular form and resilient means are provided urging the annular restraining means into engagement with said internal shoulder.

4. A constant velocity universal joint according to claim 3 which includes a flexible gaiter secured to the outer member and wherein said resilient means is constituted by a portion of said gaiter.

5. In a constant velocity universal joint having a hollow outer member with a bore which for at least part of its length is of cylindrical form, said bore being formed with longitudinally extending grooves, an inner member having a part-spherical outer surface formed with grooves which co-operate with the grooves in the outer member to provide ball tracks, torque-transmitting balls which engage and move along the grooves during joint articulation, and a ball cage with apertures in which the balls are housed, the cage acting to maintain the balls in the bisector plane of the joint and having part-spherical inner and outer surfaces which respectively engage the part-spherical surface of the inner member and the cylindrical bore of the outer member and which have centers of curvature off-set by an equal amount on opposite sides of the joint center along the joint axis, the improvement comprising restraining means acting between and formed separate from the cage and the outer member, said restraining means being arranged to prevent relative axial movement between the outer member and the cage and thus between the outer member and the inner member in at least one direction.

6. A constant velocity universal joint according to claim 5 wherein the restraining means acts to prevent movement of the cage relative to the outer member in a first direction and in which the outer member includes a bore portion of part-spherical form which engages the outer surface of the cage to prevent movement of the cage in a direction opposite to said first direction relative to the outer member.

7. A constant velocity universal joint according to claim 5 wherein the outer member is formed with an internal shoulder and resilient means are provided urging the restraining means into engagement with said internal shoulder.

8. A constant velocity universal joint according to claim 7 in which the outer portion of a flexible gaiter is secured to the outer member of the joint and said outer portion of the gaiter constitutes said resilient means urging the restraining means into engagement with said shoulder.

* * * * *